United States Patent [19]
Yeh

[11] 4,342,196
[45] Aug. 3, 1982

[54] METHOD AND APPARATUS FOR GENERATING POWER AND IRRIGATING PLANTS WITH SOLAR ENERGY AND EARTH HEAT

[76] Inventor: Hsu-Chieh Yeh, 1174 Bucknell Dr., Monroeville, Pa. 15146

[21] Appl. No.: 171,256

[22] Filed: Jul. 22, 1980

[51] Int. Cl.³ .............................................. F03G 7/00
[52] U.S. Cl. ..................................................... 60/531
[58] Field of Search ................... 60/531, 641.6, 641.1, 60/641.8

[56] References Cited

U.S. PATENT DOCUMENTS

4,036,017  7/1977  Siegel ............................ 60/641.6 X
4,135,366  1/1979  Siegel ............................ 60/531 X Primary Examiner—Allen M. Ostrager

[57] ABSTRACT

A method and apparatus for generating power and irrigating plants by using unlimited natural resources of solar energy and earth heat. The method and apparatus utilize various forms of solar energy and/or earth heat to produce pressure difference in two air-evacuated interconnecting chambers and to create periodic oscillation of the volatile liquid in said two chambers. The energy of the periodic oscillation of the liquid is used to lift water from a lower reservoir to an upper reservoir, thus creating a working hydraulic head. The water in the upper reservoir is then used to generate power or irrigate plants.

34 Claims, 14 Drawing Figures

TO TURBINE OR IRRIGATION DITCHES

METHOD AND APPARATUS FOR GENERATING POWER AND IRRIGATING PLANTS WITH SOLAR ENERGY AND EARTH HEAT

This invention relates to a method and apparatus for utilizing various forms of solar energy and earth heat for generating power and irrigating plants. The simplicity of the present invention provides an inexpensive and pollution free method and apparatus for power generation and irrigation by the use of unlimited natural resources.

In a broad sense the solar energy includes several forms of energies in nature. The most familiar form of solar energy is the sun light. Other forms of solar energy are wind energy, the energy associated with the temperature difference between the warm ocean surface water and the cold ocean deep water, and the energy associated with the temperature difference between the underground water and air, etc. The earth heat includes underground hot dry rock and hot steam.

In the method and apparatus of the present invention, the wind energy is used not through the force it produced, rather through the so called "evaporative cooling". A wet surface has a temperature slightly lower than that of a dry surface as long as the humidity of the atmosphere is less than 100 percent, because the water on the wet surface evaporates and absorbs heat from the surface for the need in evaporation. This is evaporative cooling. The evaporative cooling can be enhanced by the wind, which increases the rate of evaporation and thus decreases the temperature of the surface. The theoretical maximum temperature difference that can be obtained in this way is the difference between the dry bulb temperature and the wet bulb temperature.

Various schemes for producing electric power from the temperature difference in oceans have been proposed. Most of these schemes consist of evaporating working fluid at a higher temperature, using the vapor thus generated to drive a turbine, and condensing the exhausted vapor at a lower temperature. The disadvantages of this type of schemes is that for a small temperature difference, the vapor generated does not have enough momentum to drive a turbine. There are also other disadvantages such as the need of a large heat exchanger and a large low pressure turbine. E. J. Beck proposed another type of sea water power plant which uses a steam lift pump to lift water above a static pressure head, and utilizing the static head of the water to drive a turbine. Another scheme proposed recently by Zener and Fetkovich for producing electrical power from sea water consists of forming a foam from ocean water at ambient temperature, raising the foam to a high elevation where the liquid and the vapor in the foam is separated, and utilizing the static head of the liquid to drive a turbine.

The method and apparatus of the present invention utilize volatile liquid such as Freon 11, which has a large saturation vapor pressure change per one degree of temperature change at atmospheric temperature, as a working medium to produce significant pressure difference under the temperature difference that exists in nature or that is produced by one form or the combination of several forms of solar energy mentioned above. The pressure difference in turn produces liquid level changes in two interconnecting chambers. This change of the liquid level causes a float in one of the two chambers to be raised, and the buoyant force of the float is then transmitted through a bar, and a ratchet-and-pawl device to drive a conveyor which conveys water from a lower reservoir of water to an upper reservoir of water at a much higher elevation. The static head of the water in the upper reservoir is then used to drive turbines or to irrigate plants.

In this scheme, since volatile liquid is used as a working medium, the created pressure difference and hence the difference of the liquid levels in said two interconnecting chambers is quite significant even with a small available temperature difference. Furthermore, since the motions of the float and other moving parts are rather slow, the frictional loss is small and there if net useful energy output even with a small available temperature difference. The use of a ratchet-and-pawl device further mades it possible to create a large hydraulic head with a small liquid level difference in said two chambers. Thus the present invention can be operated even with a small available temperature difference.

The present invention can work in both sunny day and cloudy day. In a conventional solar power plant, the energy is obtained by collecting the light which comes directly from the sun. In cloudy days the direct sun light is not available. Therefore the conventional solar power plant will not work in cloudy days. The present invention, however, can also work in cloudy days. In cloudy days the sun light can reach the earth diffusively through the cloud. If the cloud is not very thick, the diffusive light can produce a temperature difference large enough to operate the present invention.

The conventional solar power plants have shortcomings of being time-restricted and/or location-restricted. Any form of solar energy is not available at all time or at every place. For example, the sun light is not available in the night and direct sun light is further not available in the cloudy day; the wind energy is not available in a calm day; and the ocean thermal energy is only available in tropic areas, but not on the land. In the conventional solar power plants, only one form of solar energy is used. Therefore the conventional solar power plants cannot work at all time and/or at every location.

The present invention is adapted for utilizing various forms of solar energy and earth heat at the same time. It combines the heating of sun light (either the direct or the diffusive sun light) and the earth heat, the evaporative cooling, and/or the cooling and the heating of ocean water or underground water for maximum utilization of all possible forms of solar energy and earth heat.

In a preferred embodiment of the present invention, I provide two air-evacuated interconnecting chambers: a warm chamber and a cold chamber. The interconnection of the two chambers is located at the lower part of the two chambers. The two chambers are partially filled with volatile liquid such as Freon 11. The liquid level in each chamber is higher than the interconnection of the two chambers so that the vapor in each chamber cannot flow into the other chamber through the interconnection.

In the following description of the method and apparatus of the present invention, the words "heat source" will be used to mean the medium that will cause the evaporation of the volatile liquid in the warm chamber, and the words "heat sink" will mean the medium that will cause the condensation of the vapor in the cold chamber. Thus the sun light, the warm ocean surface water, the underground water in winter, and earth heat are the heat sources, and the cold ocean deep water, the underground water in summer, and wet surface with fan or natural wind for evaporative cooling are the heat sinks.

In order to regulate the vapor pressure in the two chambers, an automatically controlled valve is provided between the two chambers, and in order to actuate the automatically controlled valve an actuating device is provided. The actuating device is provided with a lower set point and an upper set point. When the liquid level in the warm chamber drops to the lower set point, the automatically controlled valve automatically opens to allow the vapor in the warm chamber to flow into the cold chamber. When the liquid level of the warm chamber rises to the upper set point, the automatically controlled valve automatically closes and no vapor can flow from one chamber to the other.

To produce periodical motion of liquid in the two interconnected chambers, heat sinks are applied to condense the vapor in the cold chamber and heat sources are applied to evaporate the liquid in warm chamber. Then the vapor pressure in the cold chamber becomes smaller than the vapor pressure in the warm chamber. Since the cold chamber and warm chamber are interconnected in the liquid region, the liquid level in the cold chamber rises and the liquid level in the warm chamber drops. When the liquid level in the warm chamber drops to the lower set point, the automatically controlled valve automatically opens and vapor flows from the warm chamber to the cold chamber to equalize the vapor pressure in the two chambers. Thus the liquid levels in the two chambers also tend to equalize, and the liquid level in the warm chamber rises and the liquid level in the cold chamber drops. When the liquid level in the warm chamber rises to the upper set point, the automatically controlled valve automatically closes and vapor cannot flow from one chamber to the other. As the heat sinks and the heat sources are continuously being applied to cause the vapor pressure in the warm chamber to increase and the vapor pressure in the cold chamber to decrease, the liquid level in the warm chamber starts to drop and the liquid level in the cold chamber starts to rise. Thus the cycle repeats all over again, and the liquid levels in the two chambers move up-and-down periodically.

To obtain useful energy from the motion of the liquid in the two chambers, a float is provided in one of two chambers, say cold chamber. As the liquid level in the cold chamber moves up-and-down periodically, the float also moves up-and-down accordingly. A means is provided to transmit the buoyant force of the float to a conveyor means outside said two chambers to drive the conveyor means. A ratchet-and-pawl means is also provided to cause the conveyor means to move in only one direction. The conveyor means than carries water from a lower reservoir to an upper reservoir of water.

To produce electricity the static head of the water in the upper reservoir is used to drive turbines, and exhausted water is expelled to the lower reservoir. Electricity is produced by a generator driven by the turbines.

To irrigate plants, water in the upper reservoir is conducted to the field by means of ditches, canals, and pipes etc A number of the above-described interconnecting-cold-and-warm-two-chamber units can be stacked in a vertical array to form a "tower" and to drive a common conveyor. Many towers of this type can be installed around reservoirs. A power plant of any output requirement or an irrigation system of any size can be constructed by installing an appropriate number of the towers.

In the foregoing general description, certain purposes, objects, advantages, and the method of the present invention have been set out. Other objects and advantages of the present invention will become apparent when considering the following detailed description and appended drawings in which:

Figure 1:
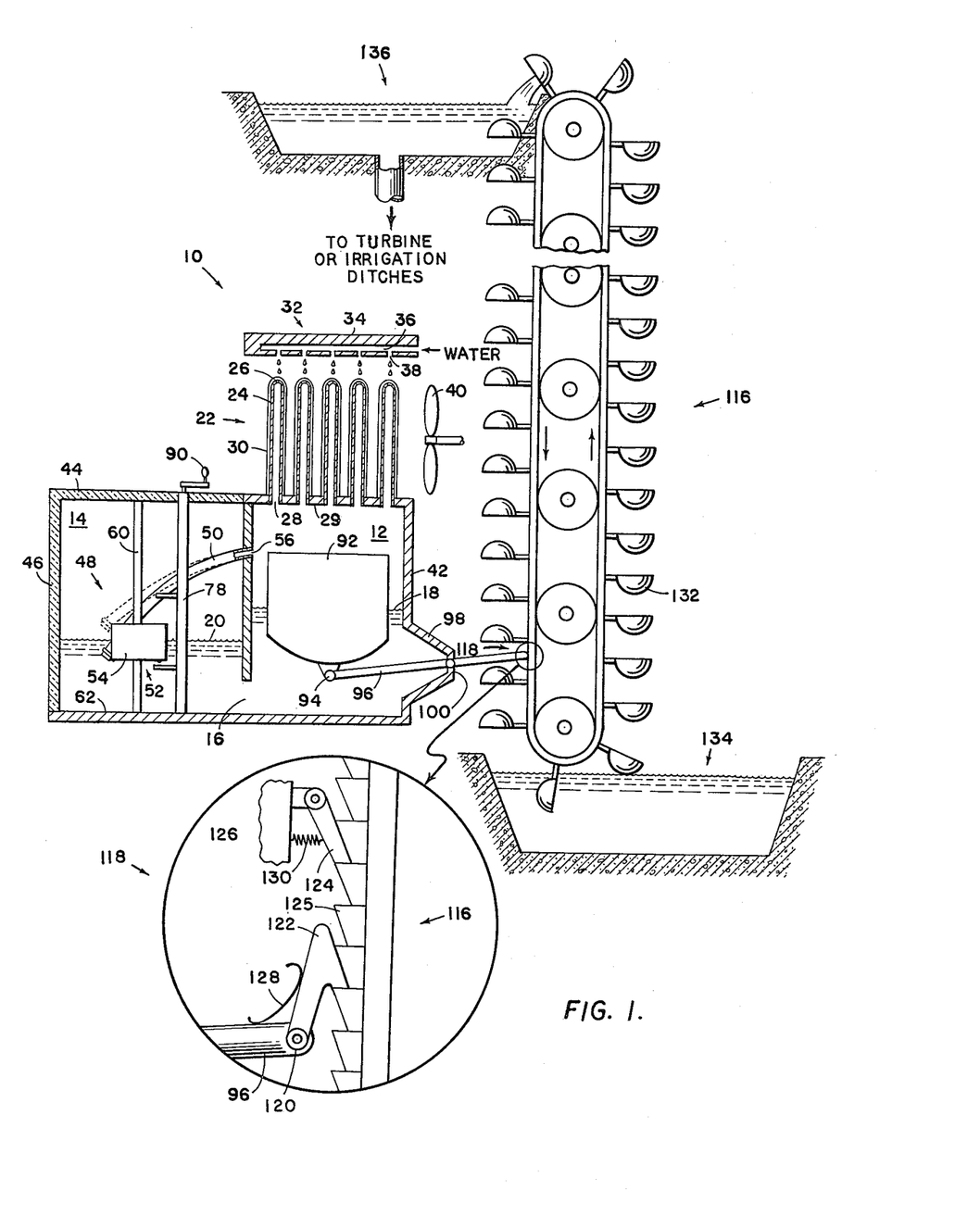
FIG. 1 is a schematic view of the embodiment of the present invention.

Referring now to FIG. 1, a preferred embodiment 10 of the present invention is illustrated. A cold chamber 12 and a warm chamber 14 are air-evacuated and interconnected with each other. The interconnection 16 is located at the lower part of the two chambers. The two chambers are partially filled with volatile liquid. Liquid level 18 in cold chamber 12 and liquid level 20 in warm chamber 14 are above interconnection 16, so that no vapor in any one of the two chambers can pass through interconnection 16 to the other chamber. When the two chambers are in equilibrium, that is, when the vapor pressure in the two chambers is the same, liquid levels 18 and 20 are at the same elevation.

Figure 2:
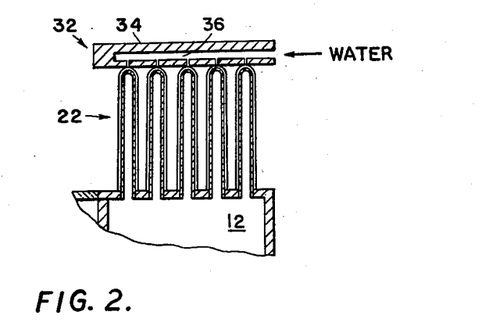
FIG. 2 shows that the roof contacts with the top of tube bundle so that the water can flow through the small holes on the roof to the water-absorbing material on the tubes.

A condenser 22 is provided on the top of cold chamber 12 to condense the vapor in cold chamber 12. Condenser 22 includes a bundle of vertical tubes 24 with upper ends 26 of the tubes closed and the lower ends 28 of the tubes being sealingly secured to the holes provided on the top 29 of cold chamber 12 so that the vapor in cold chamber 12 can enter freely into tubes 24 and the condensed liquid in tubes 24 can drip back to cold chamber 12. For evaporative cooling tubes 24 are wrapped with a layer of water-absorbing material 30 such as wick. To shield the sun light a roof 32 is provided with a sun light reflecting surface 34 to reflect away the sun light. Channels 36 are formed in roof 32. Connected to channels 36 are small holes 38 which pierce through the bottom surface of roof 32. Water is supplied to channel 36. Water-absorbing material 30 on tubes 24 can be wetted by either dripping water through holes 38 onto tubes 24 (FIG. 1), or disposing roof 32 right on the top of tube bundle 24 such that water-absorbing material 30 on tubes 24 contacts with holes 38 (FIG. 2). To accelerate the evaporative cooling a fan 40 is provided. All side walls 42 of cold chamber 12 are made of insulation material. The top 44 and all side walls 46 of warm chamber 14 are transparent to permit the sun light to enter warm chamber 14.

Figure 3:
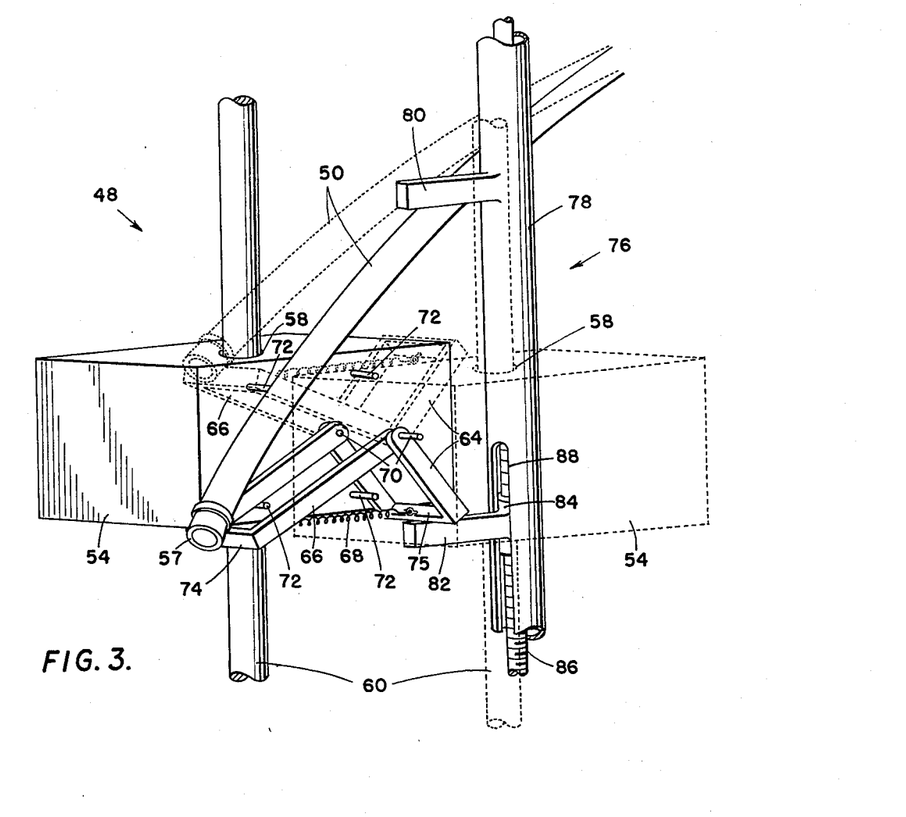
FIG. 3 is a perspective view of the automatically controlled valve with one of the floats removed as indicated by phantom lines.

To regulate the vapor pressure in the two chambers, an automatically controlled valve generally designated by the number 48 is provided in the warm chamber 14. Automatically controlled valve 48 includes a flexible tube (or hose) 50, a switch 52, and two floats 54, which support switch 52. In FIG. 3 one of floats 54 is removed as indicated by phantom lines in order to show switch 52. One end of flexible tube 50 is sealingly attached to a hole 56 on the common wall between warm chamber 14 and cold chamber 12 (FIG. 1). The other end 57 of flexible tube 50 is attached to switch 52. Floats 54 are provided with holes 58 to receive poles 60 which restrict the motion of floats 54 in vertical direction. Poles 60 are rigidly secured to the top 44 and the bottom 62 of warm chamber 14 (FIG. 1). Switch 52 includes two U-shaped elements 64 and 66 and a spring 68. Two U-shaped elements are pivotally joined together at the ends of their respective arms by pivotal elements 70 which also serve to secure switch 52 on two floats 54. Each float 54 is provided with four projections 72 which define two positions of U-shaped elements 64 and 66 as indicated by solid lines and phantom lines in FIG. 3. The ends of spring 68 are affixed to the middle of cross pieces 74 and 75 of two U-shaped elements 66 and 64 (FIG. 3), respectively. The end 57 of flexible tube 50 is also attached to cross piece 75.

To actuate switch 52, an actuating device 76 is provided. Actuating device 76 includes (FIGS. 3 and 4) a hollow tube 78, an upper arm 80 which define an upper set point of controlling mechanism, a lower arm 82 which define a lower set point of controlling mechanism, a nut 84, and a long threaded rod 86. Upper arm 80 is welded on tube 78 at an upper elevation. Lower arm 82 is welded on nut 84 at a lower elevation and sticks out of tube 78 through a vertical slot 88 (FIG. 3). The thread on rod 86 is adapted to receive nut 84. A crank 90 (FIG. 1) is provided for rotating rod 86 to cause nut 84 and lower arm 82 to move to a desired position.

When U-shaped elements 64 and 66 are in the "down" configuration as shown by the solid lines in FIG. 3, where U-shaped elements 64 and 66 form an inverted V shape, tube end 57 is lower than liquid level 20 of warm chamber 14. Therefore the vapor in warm chamber 14 cannot enter tube end 57. When U-shaped elements 64 and 66 are in the "up" configuration as shown by the phantom lines in FIG. 3, where U-shaped elements 64 and 66 form a V shape, tube end 57 is above liquid level 20 and the vapor in warm chamber 14 can enter flexible tube 50 and go to cold chamber 12.

When the vapor in cold chamber 12 is condensed by the heat sink (condenser 22) and the vapor is generated in warm chamber 14 by the heat source (sun light), the vapor pressure in cold chamber 12 decreases and the vapor pressure in warm chamber 14 increases. Then liquid level 20 in warm chamber 14 drops and liquid level 18 in cold chamber 12 rises. As liquid level 20 drops, automatically controlled valve 48 also drops accordingly, since it floats on the liquid. When automatically controlled valve 48 drops to the elevation at which cross piece 75 of U-shaped elements touches lower arm 82, U-shaped element 64 starts to be lifted up by arm 82 due to the weight of automatically controlled valve 48. As liquid level 20 continues to drop, U-shaped element 64 also continues to be lifted up until it passes the point where the two U-shaped elements 64 and 66 line up, then both U-shaped elements 64 and 66 suddenly flip up by the force of spring 68 to the "up" configuration as shown by the phantom lines in FIG. 3. As U-shaped elements 64 and 66 are in the "up" configuration, tube end 57 is above liquid level 20 and the vapor in warm chamber 14 enters flexible tube 50 and goes to cold chamber 12. This causes liquid level 20 in warm chamber 14 to rise. The vapor flow rate through flexible tube 50 and hence the rate of change of the liquid levels in the two chambers depend on the inside diameter of flexible tube 50. Therefore the inside diameter of flexible tube 50 should be chosen in such a way that the liquid level change in the two chambers is not too drastic as to cause large turbulence of the liquid. Now, as liquid level 20 in warm chamber 14 rises to the elevation at which cross piece 75 of U-shaped element 64 touches upper arm 80, U-shaped element 64 starts to be pushed down by arm 80 due to the buoyant force of floats 54 until it passes the point where two U-shaped elements 64 and 66 line up, then both U-shaped elements 64 and 66 suddenly flip down by the force of spring 68 to the "down" configuration as indicated by the solid lines in FIG. 3. As U-shaped elements 64 and 66 are in the "down" configuration the tube end 57 is below liquid level 20, and the vapor in chamber 14 cannot enter flexible tube 50. Therefore liquid level 20 begins to drop as vapor in cold chamber 12 is continuously being condensed and the liquid in warm chamber 14 is continuously being evaporated. Thus the cycle starts all over again and liquid levels 20 and 18 move up-and-down periodically.

Figures 4, 5, 6, 7, 8:
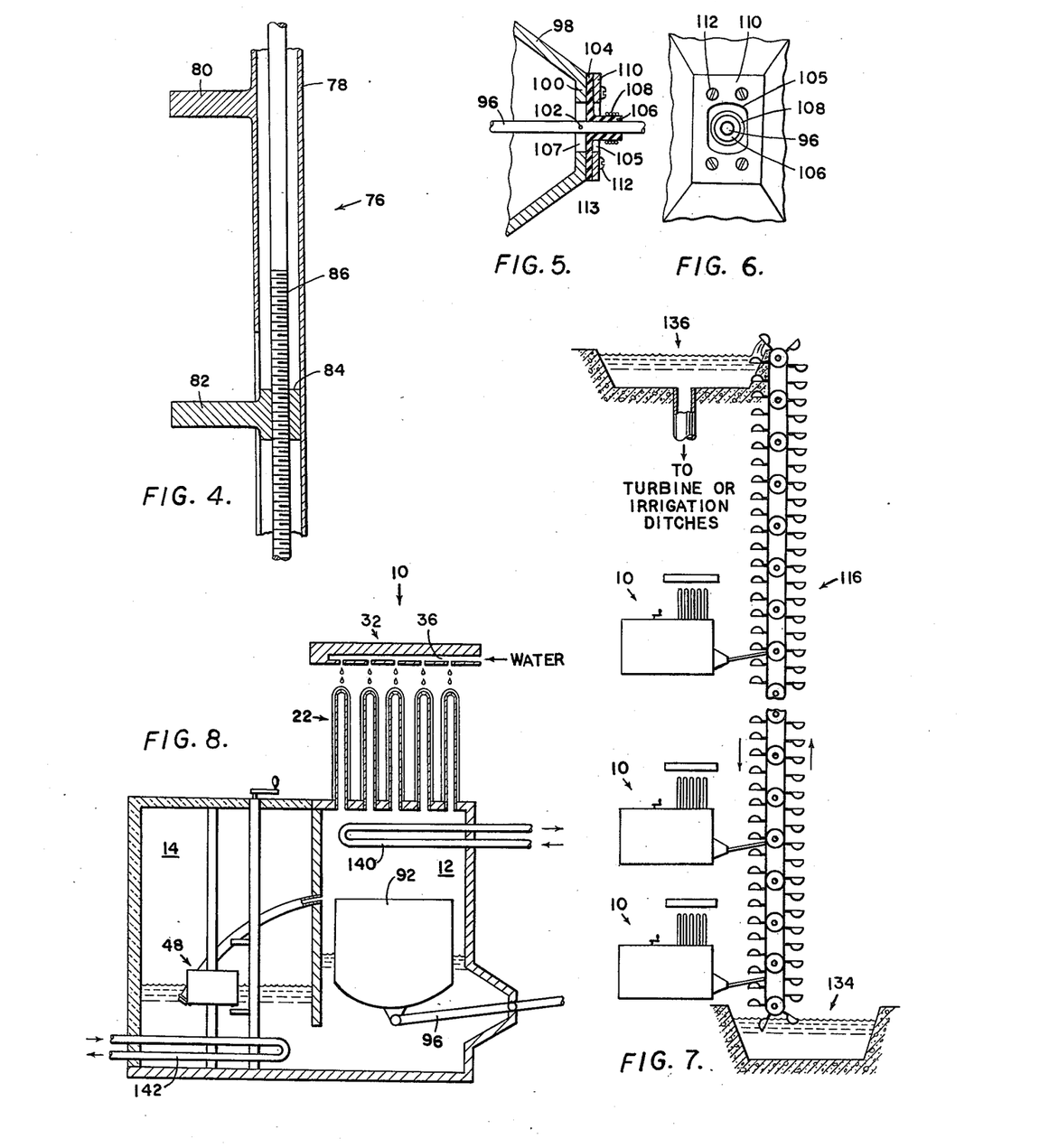
FIG. 4 is a sectional view of the actuating device.
FIGS. 5 and 6 are a sectional elevation view and a side view, respectively, of the end portion of the projecting compartment showing the penetration of the rod.
FIG. 7 shows a number of cold-and-warm-two-chamber units stacked vertically to form a "tower" and to drive a common conveyor means.
FIG. 8 shows a coil tube in the cold chamber for condensing the vapor with cold ocean deep water and a coil tube in the warm chamber for evaporating the liquid with warm ocean surface water or earth heat.

In cold chamber 12 there is a float 92 which floats on the liquid. A bar 96 is pivotally attached to a float 92 at 94. A projecting compartment 98 is provided to accommodate bar 96. Bar 96 penetrates the distal end 100 of compartment 98 and is pivotally secured by pivotal element 102 at the vicinity of said distal end (FIGS. 1 and 5).

To prevent the fluid from leaking out at the location of penetration of bar 96, a deformable sealant 104 (FIG. 5) is provided. Sealant 104 may be illustratively made of rubber. At the center of sealant 104 is formed a hollow tube 106, which is adapted to accommodate bar 96. Hollow tube 106 is tightly wrapped with a wire or a metal strip 108 to exert pressure between hollow tube 106 and bar 96 so as to prevent the fluid from leaking therefrom. A plate 110 and screws 112 are provided to exert pressure between sealant 104 and end surface 113 of compartment 98, so as to prevent the fluid from leaking out from the edges of sealant 104. At the center of plate 110 and end wall 100 of compartment 98 there are holes 105 and 107, respectively, which are larger than the outside diameter of tube 106 to permit bar 96 to pivot.

The up-and-down movement of liquid level 18 causes float 92 also to move up-and-down, which in turn causes rod 96 to pivot periodically. The buoyant force of float 92 is transmitted through rod 96 to a conveyor 116 outside compartment 98 by means of a ratchet-and-pawl device 118 (FIG. 1) to convert the up-and-down motion of the end 120 of rod 96 into one-directional motion of conveyor 116.

Ratchet-and-pawl device 118 includes pawls 122 and 124 and a "ratchet" 125 which is a toothed belt on conveyor 116 (FIG. 1). Pawl 122 is pivotally secured to the end 120 of bar 96, and pawl 124 is pivotally secured to a fixed wall or structure 126. Springs 128 and 130 are provided to force pawls 122 and 124, respectively, to engage with ratchet 125. Pawl 122 and ratchet 125 cause conveyor 116 to move in one direction. Pawl 124 prevents conveyor 116 from moving in reversed direction. Thus ratchet-and-pawl device 118 converts the up-and-down motion of the end 120 of bar 96 into one-directional motion of conveyor 116.

Attached to conveyor 116 are many buckets 132. As conveyor 116 is driven by ratchet-and-pawl device 118, buckets 132 scoop up water from a lower reservoir 134, carry it up, and pour it into an upper reservoir 136, which is at an elevation much higher than lower reservoir 134. Lower reservoir 134 and upper reservoir 136 may illustratively be pools, rivers, lakes, or underground water.

To generate electricity the water in upper reservoir 136 is used to propel a turbine and then is exhausted to lower reservoir 134. The turbine drives a generator to produce electricity.

To irrigate plants the water in upper reservoir 136 is conducted to field by means of canals, ditches, and pipes, etc.

FIG. 7 shows a number of cold-and-warm-two-chamber units 10 stacked in a vertical array to form a tower and to drive a common conveyor 116. Many such towers can be installed around upper reservoir 136 and lower reservoir 134.

If the ocean water is to be used as an additional heat sink and a heat source, then another condenser consisting of a coil tube 140 fed with the cold ocean deep water is provided in the vapor region of cold chamber 12 and a heater consisting of a coil tube 142 fed with the warm ocean surface water is provided in the liquid region of warm chamber 14 (FIG. 8).

To utilize earth heat, coil tube 142 can be fed with underground steam or the hot water obtained by pumping water through hot dry rock.

Figure 9:
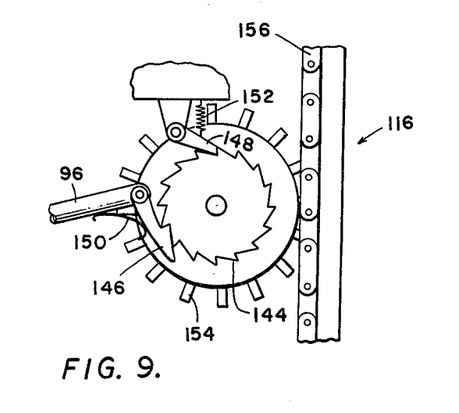
FIG. 9 shows a ratchet-and-pawl device for use in conjunction with the weight-lift method.

The energy of the up-and-down motion of the liquid in the cold-and-warm-two-chamber unit 10 can also be translated to useful work by means of the weight of float 92, rather than the buoyant force of float 92 as described above. In this method float 92 is made heavier than that of the previously described buoyant-force method. When liquid level 18 in cold chamber 12 rises, the liquid lifts float 92 up and increase the potential energy of float 92. When liquid level 18 drops, the potential energy of float 92 is transmitted through bar 96 to conveyor 116. For this case the ratchet-and-pawl device 118 in FIG. 1 is replaced by that shown in FIG. 9. In FIG. 9 the ratchet is a toothed wheel 144. Pawl 146 causes ratchet wheel 144 to turn, and pawl 148 prevents ratchet wheel 144 from turning in the reversed direction. Springs 150 and 152 cause pawls 146 and 148, respectively, to engage on the teeth of wheel 144. Another toothed wheel 154 having coaxis with wheel 144 is provided to drive conveyor 116 through chain 156. It is noted that in this weight-lift method float 92 is made as heavy as possible as long as it can float, so that maximum potential energy of float 92 can be obtained from liquid motion. In the previously described buoyant-force method float 92 is made as light as possible so that maximum buoyant force can be transmitted to conveyor 116.

Figure 10:
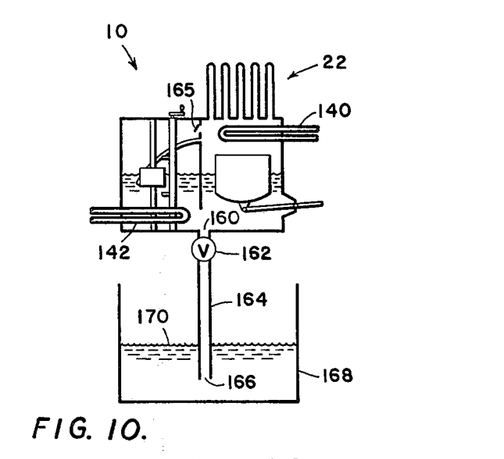
FIG. 10 is a sectional view showing the arrangement of the two-chamber unit, a pipe, and an open container for air-evacuating and partially filling the two-chamber unit.

The requirement of air-evacuating and partially filling cold-and-warm-two-chamber unit 10 with the desired amount of said volatile liquid can be achieved inexpensively without using vacuum pump by the following method. A drain hole 160 (FIG. 10) with a valve 162 is provided on the bottom of the unit, and a pipe 164 is connected to valve 162. Another valve 165 is provided on the common wall between the two chambers for manually regulating the pressure in the two chambers. Valves 162 and 165 are opened and the unit is turned upside-down. The unit is then filled completely with said volatile liquid from end 166 of pipe 164. Then end 166 of pipe 164 is plugged and the unit is turned back to the upright position. Now, prepare an open container 168 partially filled with said volatile liquid. Submerge the lower portion of said pipe into the volatile liquid in open container 168 and unplug the pipe end 166. The volatile liquid in the unit cannot flow out through pipe 164, because the lower end 166 of pipe 164 is under the liquid surface 170 of open container 168 and no air can get into the pipe end 166. Next, heat the volatile liquid in the unit to generate vapor by feeding coil tube 142 with hot fluid, which may illustratively be hot water or hot air, or by external heat source: for example, by heating the bottom of the unit with hot gas. The generated vapor then expels some of the liquid in the unit to container 168 through pipe 164. Valve 165 causes the pressure and hence the liquid levels in the two chambers to be equalized. When the desired amount of liquid has been expelled, close valves 162 and 165 and disconnect pipe 164 from valve 162. This leaves the unit containing no air but the desired amount of liquid and its own vapor.

Figures 11, 12:
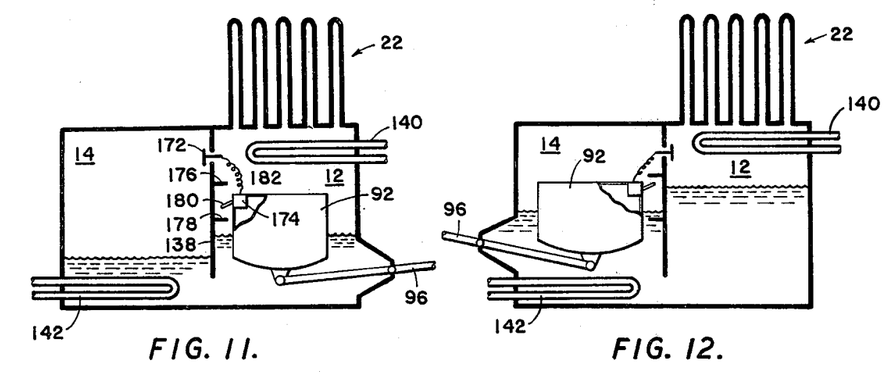
FIG. 11 shows an alternative automatically controlled valve.
FIG. 12 shows that the float is in the warm chamber.

FIG. 11 shows another type of automatically controlled valve. It includes an electrically operated valve 172 on the upper part of the common wall 138 between cold chamber 12 and warm chamber 14, an electric switch 174 with handle 180, and an actuating device for turning switch 174 on or off. When handle 180 of switch 174 is flipped up, switch 174 is on, and when handle 180 is flipped down, switch 174 is off. The actuating device may simply consist of two projections on any inner wall of cold chamber 12, or similar to the one shown in FIGS. 3 and 4 with the upper projection adjustable. FIG. 11 shows that the actuating device is on common wall 138 and consists of upper projection 176 and lower projection 178. Valve 172 is operated electrically by switch 174 with electric wire 182 connecting them. When switch 174 is on, valve 172 is closed and the vapor pressure in warm chamber 14 becomes larger than the vapor pressure in cold chamber 12 due to the effects of the heat source in warm chamber 14 and the heat sink in cold chamber 12. Therefore liquid level 18 and hence float 92 in cold chamber 12 move up. As float 92 moves up to the elevation where upper projection 176 touches handle 180 of switch 174 and causes handle 180 to flip down, the switch 174 is off and hence valve 172 is opened. The vapor in warm chambers 14 then flow into cold chamber 12 to equalized the pressure in two chambers, and liquid level 18 and hence float 92 move down. When float 92 moves down to the elevation where lower projection 178 touches handle 180 of switch 174 and causes handle 180 to flip up, the switch 174 is on and hence valve 172 is closed. The vapor in warm chamber 14 cannot flow into cold chamber 12, and the vapor pressure in warm chamber 14 becomes larger than that in cold chamber 12 again due to the continuous application of the heat source in warm chamber 14 and the heat sink in cold chamber 12. Therefore liquid level 18 and hence float 92 in cold chamber 12 move up, and the cycle repeats all over again.

Figure 13:
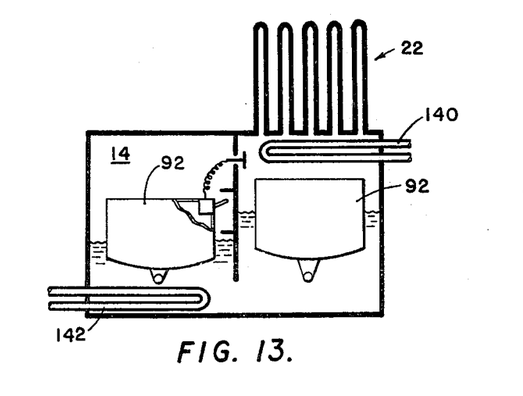
FIG. 13 shows that a float is in the cold chamber and another float is the warm chamber.
Figure 14:
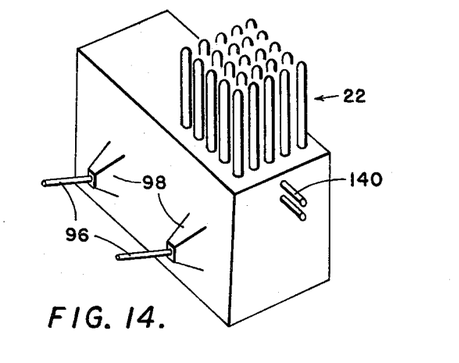
FIG. 14 is a perspective view of the two-chamber unit shown in FIG. 13.

Instead of disposing float 92 in cold chamber 12, we can also dispose float 92 in warm chamber 14, or dispose one float in cold chamber 12 and another one in warm chamber 14, FIG. 12 shows that float 92 is in warm chamber 14, and rod 96 penetrates the compartment 98 on the side wall of warm chamber 14 to drive conveyor mean 116, which is also on the side of warm chamber 14, accordingly. FIG. 13 shows that one of floats 92 is in cold chamber 12 and another one is in warm chamber 14. FIG. 14 is the prospective view of FIG. 13 showing that rods 96, which are pivotally attached to floats 92, penetrate one of the side walls of the two-chamber unit to drive conveyor means 116.

From the above description it is clear that the utilization of bar 96 and ratchet-and-pawl device 118 enables the present invention to raise water from lower reservoir 134 to upper reservoir 136, which is at a much higher elevation than lower reservoir 134, and the usable hydrostatic head thus produced is much larger than the difference between liquid levels 18 and 20 in two chambers 12 and 14. This is feasible as long as the moment of force about axis 102 due to the buoyant force of float 92 in case of buoyant-force method or due to the weight of float 92 in case of weight-lift method is larger than the moment of force about the same axis due to the weight of the water of buckets 132. Thus with the present invention we can use the small temperature differences available in nature to produce large hudrostatic head which is large enough to drive a turbine.

While the invention has been described in its preferred embodiment, modifications and variations will become apparent to those skilled in the art. Such modifications and variations are considered to be within the purview of the following claims.

I claim:

1. A method of utilizing various forms of solar energy and earth heat for power generation and irrigation comprising the steps of:
    a. providing interconnecting air-evacuated warm chamber and cold chamber, said two chambers being partially filled with volatile liquid, which has a large change in saturation vapor pressure per one degree of temperature change at the operation temperature, the interconnection between said two chambers being located below the levels of said volatile liquid, so that when the liquid level in one of said two chambers rises, the liquid level in the other chamber drops;
    b. providing an automatically controlled valve means, which acts in such a way that when the liquid level in said warm chamber drops to a first elevation, said automatically controlled valve means automatically opens to cause the vapor in said warm chamber to flow into said cold chamber, and when the liquid level in said warm chamber rises to a second elevation, which is higher than said first elevation, said automatically controlled valve means automatically closes to prevent the vapor from flowing between said two chambers;
    c. creating up-and-down periodic motion of the liquid in said two chambers by condensing the vapor in said cold chamber and evaporating the liquid in said warm chamber, and by the action of said automatically controlled valve means; and
    d. translating the energy of said up-and-down periodic motion of liquid into useful work.

2. The method of claim 1 wherein the step of translating the energy of said up-and-down periodic motion of liquid into useful work includes the steps of:
    a. transmitting the energy of said up-and-down periodic motion of liquid to a conveyor means outside said two interconnecting chambers to drive said conveyor means;
    b. transporting water by means of said conveyor means from a lower reservoir of water to an upper reservoir of water, thus creating a working hydraulic head in said upper reservoir; and
    c. translating said first working hydraulic head into useful work.

3. The method of claim 1 wherein the step of providing two interconnecting air-evacuated chambers partially filled with volatile liquid includes the steps of:
    a. providing a hole on the bottom of said two-chamber unit and attaching a first valve to said hole;
    b. providing a second valve at the upper elevation of the common wall between said two chambers;
    c. connecting a pipe to said valve;
    d. opening said first and second valves;
    e. turning said two-chamber unit upside down;
    f. filling up said two-chamber unit completely with said volatile liquid through said pipe, and plugging the end of said pipe, thus there is no air in said two-chamber unit;
    g. turning said unit back to the upright position;
    h. providing an open container partially filled with said volatile liquid;
    i. submerging the lower portion of said pipe into the volatile liquid in said open container and unplugging the lower end of said pipe; and
    j. heating the volatile liquid in said two-chamber unit to generate vapor, which expels part of the volatile liquid in said two-chamber unit through said first valve and pipe into said open container, closing said first and second valves when appropriate amount of liquid has been expelled from said two-chamber unit, and disconnecting said pipe from said first valve, thus leaving no air but the desired amount of volatile liquid and its own vapor in said two-chamber unit.

4. The method of claim 2 wherein the step of translating said working hydraulic head into useful work includes the step of driving turbine means for generating power with the water in said upper reservoir.

5. The method of claim 2 wherein the step of translating said working hydraulic head into useful work includes the step of irrigating with the water in said upper reservoir to fields for plant growth.

6. An apparatus for utilizing various forms of solar energy and earth heat for power generation and irrigation comprising:
    a. air-evacuated interconnecting warm chamber and cold chamber, said two interconnecting chambers being partially filled with volatile liquid, which has a large change in saturation vapor pressure per one degree of temperature change at the operation temperature, the interconnection of said two chambers being located at the lower part of said two chambers, and the liquid levels in said two chambers being higher than said interconnection, so that when the liquid level in one of said two chambers rises, the liquid level in the other chamber drops;
b. an automatically controlled valve means, which acts in such a way that when the liquid level in said warm chamber drops to a first elevation, said automatically controlled valve means automatically opens to cause the vapor in said warm chamber to flow into said cold chamber, and when the liquid level in said warm chamber rises to a second elevation, which is higher than said first elevation, said automatically controlled valve means automatically closes to prevent the vapor from flowing between said two chambers;
c. means of condensing the vapor in said cold chamber;
d. means of evaporating the volatile liquid in said warm chamber; and
e. means of translating the energy of the up-and-down periodic motion of the liquid in said interconnecting-cold-and-warm-two-chamber unit into useful work, said up-and-down periodic motion of the liquid being created by said means of condensation, means of evaporation, and automatically controlled valve means.

7. The apparatus of claim 6 wherein said means of translating the energy of the up-and-down motion of the liquid in said interconnecting-cold-and-warm-two-chamber unit into useful work includes:
a. a lower reservoir of water located outside said interconnecting-cold-and-warm-two-chamber unit;
b. an upper reservoir of water, which is higher than said lower reservoir, located outside said interconnecting-cold-and-warm-two-chamber unit;
c. a conveyor means for transporting water from said lower reservoir to said upper reservoir;
d. means of transmitting the energy of said up-and-down motion of liquid in said interconnecting-cold-and-warm-two-chamber unit to said conveyor means to drive said conveyor means, said conveyor then transporting water from said lower reservoir to said upper reservoir, thus creating a working hydraulic head; and
e. means located outside said interconnecting-cold-and-warm-two-chamber unit for utilizing said working hydraulic head of the water in said upper reservoir for useful work.

8. The apparatus as set forth in claim 7 having a plurality of said interconnecting-cold-and-warm-two-chamber units, which are stacked to form a tower and to drive a common said conveyor means.

9. The apparatus as set forth in claim 8 having a plurality of said towers and conveyor means surrounding said lower reservoir and upper reservoir.

10. The apparatus of claim 7 wherein said conveyor means includes a conveyor extending vertically from the elevation of said lower reservoir to the elevation of said upper reservoir, and buckets attaching on said conveyor.

11. The apparatus of claim 7 wherein said means for utilizing said working hydraulic head of the water in said upper reservoir includes turbines for generating power.

12. The apparatus of claim 7 wherein said means for utilizing said working hydraulic head of the water in said upper reservoir includes canals, ditches, and pipes for irrigating plants.

13. The apparatus of claim 7 wherein said means of transmitting the energy of said up-and-down motion of liquid in said interconnecting-cold-and-warm-two-chamber unit comprises a float-and-bar set, said float-and-bar set comprising a main float floating on the liquid in said two-chamber unit and a bar with first end pivotally attached to said main float and second end pivotally attached to a ratchet-and-pawl means outside said two-chamber unit to drive said conveyor, said two-chamber unit having a projecting compartment to accommodate said bar, said bar penetrating the extreme end of said projecting compartment to the outside and being pivotally secured with a pivotal element at the vicinity of penetration, and the leakage of vapor and liquid at the location of penetration being prevented by sealing with deformable sealant.

14. The apparatus of claim 13 wherein said ratchet-and-pawl means includes a first pawl pivotally attached to said second end of said bar, a second pawl pivotally secured to a fixed structure, and teeth on said conveyor, said first pawl being forced to engage on said teeth on said conveyor by a first spring to enable said first pawl to drive said conveyor, said second pawl being forced to engage on said teeth on said conveyor by a second spring to prevent said conveyor from moving in reverse direction.

15. The apparatus of claim 13 wherein said ratchet-and-pawl means includes a first pawl pivotally attached to said second end of said bar, a second pawl pivotally secured to a fixed structure, a ratchet wheel, a toothed wheel which has the common axis with said ratchet wheel so as to rotate together with said ratchet wheel, and a chain on said conveyor adapted for engaging with the teeth of said toothed wheel, said first pawl being forced to engage with the teeth of said ratchet wheel by a first spring to enable said first pawl to drive said ratchet wheel, said second pawl being forced to engage with the teeth of said ratchet wheel by a second spring to prevent said ratchet wheel from reversal of motion, said toothed wheel being rotated with said ratchet wheel, and said conveyor being driven by said toothed wheel.

16. The apparatus of claim 13 wherein said float-and-bar set is in said cold chamber and said projecting compartment is on the side wall of said cold chamber.

17. The apparatus of claim 13 wherein said float-and-bar set is in said warm chamber and said projecting compartment is on the side wall of said warm chamber.

18. The apparatus as set forth in claim 13 having two float-and-bar sets: one set being in said cold chamber and another set being in said warm chamber.

19. The apparatus of claim 13 wherein said automatically controlled value means includes:
a. an actuating device comprising an upper and a lower projections on the inner wall of said two-chamber unit;
b. an electric switch on said main float near said upper and lower projections, said switch having a movable handle for turning said switch on or off, said handle being projecting from switch such that when said main float moves up to the elevation where said upper projection and said electric switch are at the same height, said upper projection touches said handle and causes said electric switch to turn off, and when said main float moves down to the elevation where said lower projection and said electric switch are at the same elevation, said lower projection touches said handle and causes said electric switch to turn on; and c. a valve on the upper part of the common wall between said warm chamber and cold chamber, said valve being electrically operated by said electric switch such that when said electric switch is turned on, said valve is closed to prevent vapor from flowing from one chamber to another, and when said electric switch is turned off, said valve is opened to permit vapor to flow between said two chambers.

20. The apparatus of claim 16 wherein said automatically controlled valve means includes:

a. first and second poles in said warm chamber;

b. first and second auxiliary floats adapted for floating on the volatile liquid in said warm chamber and to move up-and-down with said liquid, each said auxiliary float having a vertical hole adapted for accommodating one of said poles which restricts the motion of said auxiliary floats in vertical direction;

c. a switch attached to said two auxiliary floats and adapted for moving up-and-down with said auxiliary floats, said switch comprising first and second U-shaped elements and a spring, each said U-shaped element having two arms and a cross piece, said two U-shaped elements being pivotally joined together at the ends of respective said arms with pivotal elements, which are also used to attach said switch on said two floats, one end of said spring being affixed to the cross piece of said first U-shaped element and the other end of said spring being affixed to the cross piece of said second U-shaped element, each said auxiliary float having four projections on the surface facing said switch to define two positions of said two U-shaped elements: a position where said two U-shaped elements form a V-shaped or "up" configuration and a position where said two U-shaped elements form an inverted V-shaped or "down" configuration;

d. a flexible tube located in said warm chamber, first end of said flexible tube being sealingly secured to a hole on the common wall between said two chambers, second end of said flexible tube being attached to the cross piece of sid first U-shaped element of the switch such that when said two U-shaped elements are in said V-shaped configuration, said second end of the flexible tube is above the liquid level, and when said two U-shaped elements are in said inverted V-shaped configuration, said second end of the flexible tube is below the liquid level; and e. an actuating device located in said warm chamber for actuating said switch, said actuating device having a third pole, which has an upper and a lower projections, said third pole being located near the cross piece of said second U-shaped element of the switch such that when the liquid level in said warm chamber decreases to said first elevation, said lower projection will contact said cross piece of said second U-shaped element and cause two U-shaped elements to flip from said inverted V-shaped configuration to said V-shaped configuration, and when the liquid level in said warm chamber increases to said second elevation, said upper projection will contact said cross piece of said second U-shaped element and cause said two U-shaped elements to flip from said V-shaped configuration to said inverted V-shaped configuration.

21. The apparatus of claim 16 wherein said third pole comprises a vertical tube affixed to the top and the bottom of said warm chamber and having a vertical slit, a threaded rod located inside said vertical tube and penetrating out of the top of said warm chamber, a nut adapted for accommodating the thread on said threaded rod, and a crank located above said warm chamber and affixed to the upper end of said threaded rod, said lower projection on the third pole being affixed to said nut and sticking out horizontally through said slit of the vertical tube, so that the elevation of said lower projection can be changed by turning said crank, said upper projection on the third pole being affixed to the outer surface of said vertical tube.

22. The apparatus of claim 6 wherein said means of condensing the vapor in said cold chamber includes a bundle of vertical tubes affixed to the top of said cold chamber, and a roof above said tube bundle, the top of said cold chamber having holes in which the lower ends of said tubes are sealingly secured, thus the vapor in said cold chamber can enter said tubes, the upper end of each tube of said tube bundle being closed, each said tube being wrapped with water-absorbing material and means being provided to wet said water-absorbing material with water for evaporative cooling, the top surface of said roof being covered with a sun light reflecting material.

23. The apparatus of claim 22 wherein said means of wetting said water-absorbing material includes channels formed in said roof and many small holes connecting said channels and piercing through the bottom surface of said roof, said channels being supplied with water so that water will drip onto said water-absorbing material on the tubes through said small holes.

24. The apparatus of claim 22 wherein said means of wetting said water-absorbing material includes channels formed in said roof and small holes connecting said channels and piercing through the bottom surface of said roof, said bottom surface of the roof being directly contacting with said tube bundle such that the upper end of each tube in said tube bundle is directly beneath said small holes, said channels being supplied with water so that the water will flow through said small holes to said water-absorbing material.

25. The apparatus of claim 22 wherein said means of condensing the vapor in said cold chamber further includes a fan adapted for blowing air to said tube bundle.

26. The apparatus of claim 25 wherein said means of condensing vapor in said cold chamber further includes a condenser located in the vapor region of said cold chamber.

27. The apparatus of claim 26 wherein said condenser is fed with cold deep ocean water.

28. The apparatus of claim 26 wherein said condenser is fed with cold underground water during warm days.

29. The apparatus of claim 6 wherein said means of evaporating the liquid in said warm chamber includes transparent top and side walls of said warm chamber to permit sun light to enter into said warm chamber and to heat the liquid in said warm chamber.

30. The apparatus of claim 29 wherein said means of evaporating the liquid in said warm chamber further includes a heater located in the liquid region in said warm chamber.

31. The apparatus of claim 30 wherein said heater is fed with warm surface ocean water.

32. The apparatus of claim 30 wherein said heater is fed with the hot water obtained by pumping water through hot dry rock.

33. The apparatus of claim 30 wherein said heater is fed with underground steam.

34. The apparatus of claim 30 wherein said heater is fed with underground warm water during cold days.

* * * * *